United States Patent [19]

Skrobisch

[11] Patent Number: 4,651,856

[45] Date of Patent: Mar. 24, 1987

[54] TORQUE LIMITING CLUTCHES CONTROLLED BY PERMANENT MAGNET MEANS

[76] Inventor: Alfred Skrobisch, 64 Fulton Blvd., Commack, N.Y. 11725

[21] Appl. No.: 778,862

[22] Filed: Sep. 23, 1985

[51] Int. Cl.[4] .............................................. F16D 11/00
[52] U.S. Cl. .................................. 192/56 R; 192/150
[58] Field of Search ............... 192/56 R, 21.5, 84 PM, 192/150; 464/29, 30

[56] References Cited

U.S. PATENT DOCUMENTS

| | | | |
|---|---|---|---|
| 3,150,725 | 9/1964 | Hornschuch et al. | 464/29 X |
| 3,221,389 | 12/1965 | Cowell | 464/29 X |
| 3,240,304 | 3/1966 | Wickersham | 192/150 X |
| 4,174,621 | 11/1979 | Woltjen | 192/56 R |
| 4,479,786 | 10/1984 | De Bisschop | 464/89 |

Primary Examiner—William F. Pate, III
Assistant Examiner—Creighton Smith
Attorney, Agent, or Firm—Edward H. Loveman

[57] ABSTRACT

A torque limiting clutch having two or more cylindrical magnetic rings with coplanar edges abutted to a flat surface portion at one side of a magnetic driven member which may be a flat plate. The rings may be cylindrically round, or polygonal with flat sides. Between the rings are ring-like, cylindrical, arcuate, or flat permanent magnets conforming to the radial spacing of the rings and maintaining a magnetic circuit or circuits with the driven plate. A flat bar or other mechanical drive means engages the free other edges of the rings and is driven rotationally by a motor drive shaft or other driving means. The driven plate carries a driven shaft, or is adapted for engaging driven gear means or a driven pulley belt.

22 Claims, 24 Drawing Figures

TORQUE LIMITING CLUTCHES CONTROLLED BY PERMANENT MAGNET MEANS

BACKGROUND OF THE INVENTION

1. Field of the Invention

This invention relates to the art of magnetically controlled clutches, and more particularly concerns relatively simple slipping or overrunning clutches which employ permanent magnet means to maintain traction between drive and driven parts and limit the amount of torque transmitted to a load from an electric motor or other driving device.

2. Description of the Prior Art

While there are many known types of electromagnetically controlled clutches, there are few simple permanent magnet types of slipping or overrunning clutches. These so-called "torque limiters" are usually of the hysteresis or eddy current types whose special slipping characteristics limit their general usefullness as much as does their price. There has been a need for a relatively simple, inexpensive torque limiter that does not use electromagnetic means and can be easily preset for the amount of torque a load can demand from a driving device such as an electric motor.

SUMMARY OF THE INVENTION

According to the invention, permanent magnet means are provided for controlling the torque limiting action rather than electrmagnetic means. One basic form of the invention employs a magnetizable flat metal plate which is connectable in one way or another to the driven load. Abutted to a flat side of the plate are flat, coplanar ends of two concentric radially spaced cylindrical, magnetizable rings. Disposed between the rings are one or more permanent magnets which maintain a magnetic circuit or circuits that include the magnetizable flat plate and abutted rings. A drive arm or other drive means holds the rings in concentric array and drives them rotationally, while leaving them axially free so that each ring can make full edge contact with the plate. When the required torque for the driven load exceeds a predetermined magnitude, slippage occurs between the drive rings and the driven plate. When the load torque drops, driving traction between the drive rings and driven plate is automatically restored. Thus, the present torque limiter acts like an automatically resettable machanical circuit breaker.

In one form of the invention, the driven plate may be a circular disk and the drive rings are right cylinders. The permanent magnet between the cylinders is also cylindrical. In another form of the invention the drive rings have a plurality of flat sides defining concentric, radially spaced polygonal cylinders. Between the cylinders are flat permanent magnets. Increased torque can be obtained by employing more than two concentric drive rings, for example, three or four. Between each pair of drive rings may be one or more permanent magnets. The driven plate may be rectangular, annular or may have another symmetrical shape. The essential feature required is that the driven plate present a flat annular, circular path, surface or track to the magnetically applied drive rings. The driven plate can be adapted to drive a shaft, pulley belt, gear train, or other power transmission means.

These and other objects and many of the attendant advantages of this invention will be readily appreciated as the same becomes better understood by reference to the following detailed description when considered in connection with the accompanyng drawings in which:

DESCRIPTION OF THE PREFERRED EMBODIMENTS

Figure 9:
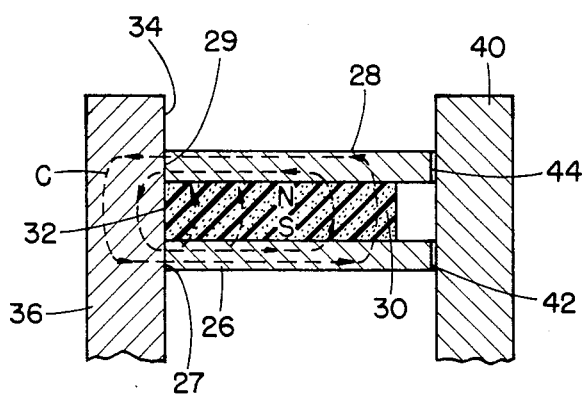
FIG. 9 is a fragmentary enlarged portion of FIG. 6, illustrating diagrammatically the magnetic circuit of the clutch of FIGS. 1-7.

Referring now to the drawings wherein like reference characters designate like or corresponding parts throughout, there is illustrated in FIGS. 1-6 a first torque limiting clutch generally designated as reference numeral 25 comprising two radially spaced, concentric, cylindrical rigns 26, 28 made of magnetizable material such as soft iron. Disposed between the magnetizable rings 26, 28 is a cylindrical permanent magnet 30 in the form of a cylindrical ring. The magnet 30 is so magnetized that its N pole is radially at the outermost adjacent ring 28 and its S pole is at the most inner adjacent ring 26, as illustrated in FIG. 9. The magnet 30 may be made most expeditiously from a strip of so-called rubber magnet material. This would be a flexible strip of artificial rubber or plastic in which is embedded a powder of a ceramic magnetic material such as barium ferrite. The strip may be magnetized as shown in FIG. 9, then coiled or rolled into a cylindrical form and inserted between the rings 26, 28 in a snug fitting array. A flat annular bottom or front edge 32 of the magnet 30 may be spaced from a flat side 34 of a magnetizable plate 36.

The flat edges 27, 29, of the two rings 26, and 28 will be abutted to the flat side 34 of the magnetic plate 36. The width of the rings 26 and 28 need not be equal since they will move freely, axially due to the magnetic circuit C, shown in FIG. 9, to adhere magnetically to the abutting side 34 of the plate 36.

Figure 1:
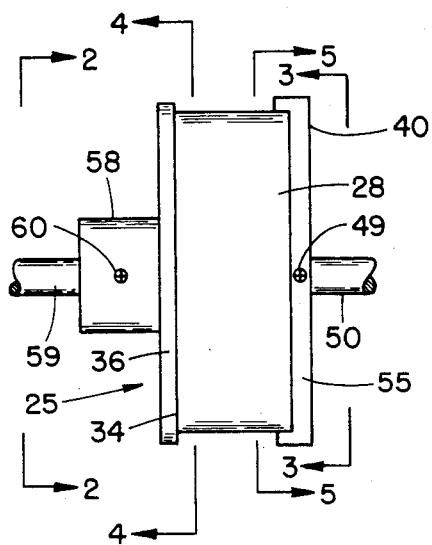
FIG. 1 is a side elevational view of a torque limiting clutch embodying a first form of the invention.
Figure 2:
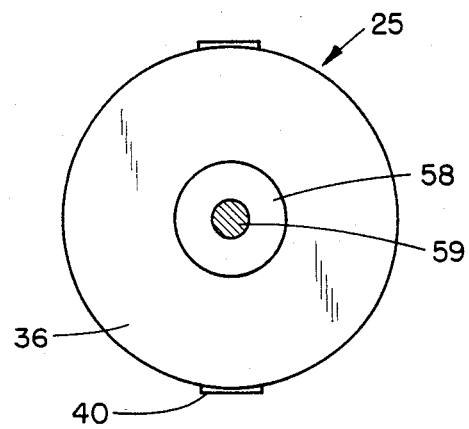
FIG. 2 and FIG. 3 are front and rear side elevational views taken along lines 2—2 and 3—3 respectively of FIG. 1.
Figure 3:
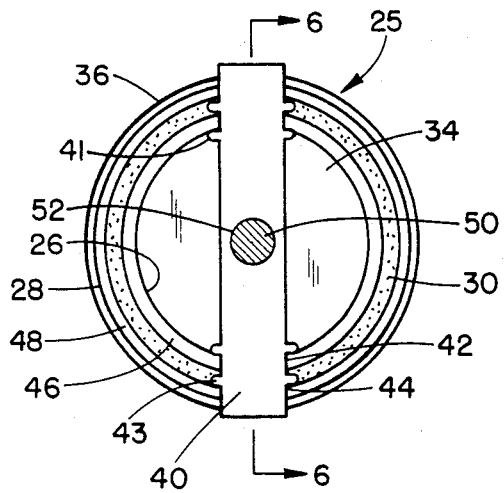
Figure 4:
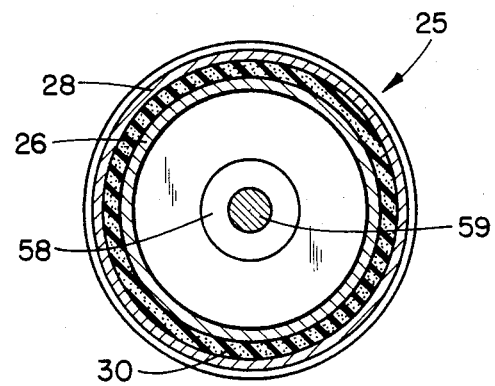
FIG. 4 and FIG. 5 are cross-sectional views taken along lines 4—4 and 5—5 respectively of FIG. 1.
Figure 5:
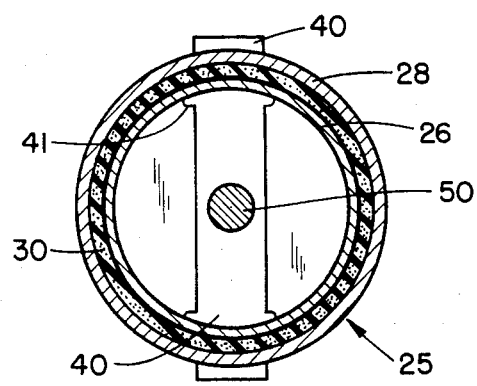
Figure 6:
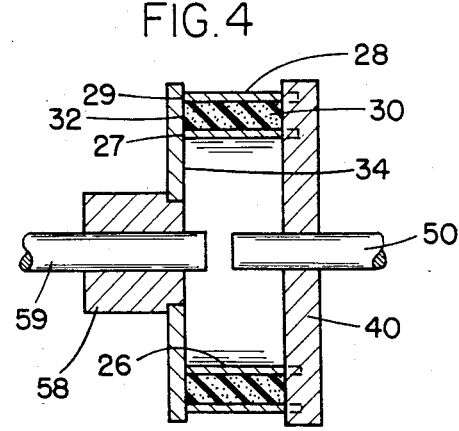
FIG. 6 is a cross sectional view taken along line 6—6 of FIG. 3.
Figure 7:
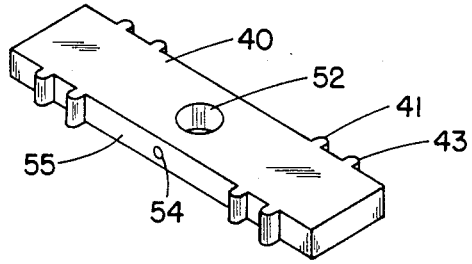
FIG. 7 is an enlarged isometric view of a drive bar employed in the clutch of FIGS. 1-6.
Figure 8:
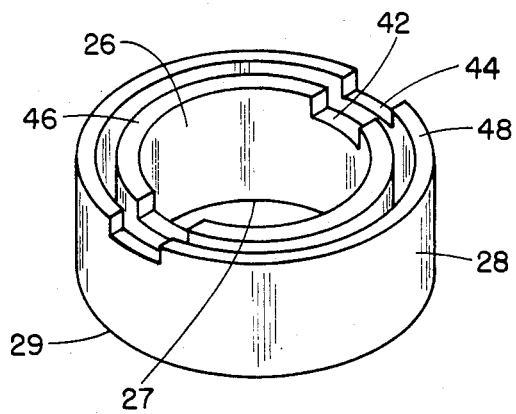
FIG. 8 is a perspective view of an assemblage of two drive rings employed in the clutch of FIGS. 1-7.

In order to rotate the drive rings 26, and 28, there is provided a drive arm 40, and as best shown in FIGS. 3, 5, and 7, the arm 40 is a flat, rectangular bar formed with spaced arcuate tabs or ears 41, 43. The arm 40 fits into diametrally aligned rectangular notches 42, 44 formed in forward or top edges 46, 48 of recpective rings 26, 28 as illustrated in FIGS. 6 and 8. The tabs 41 abut the inner cylindrical side of the ring 26 and the tabs 43 abut the inner cylindrical side of the ring 28. By this arrangement turning of the arm 40 will cause the rings 26, and 28 to turn simultaneously. A drive shaft 50 is inserted into a central hole 52 in the arm 40 and is held by a set screw 49 inserted in a threaded hoel 54 at the center of a side edge 55 of the arm 40; see FIGS. 1 and 7. The drive shaft 50 can be connected to any suitable rotational drive device such as an electric motor, pneumatic motor, or the like.

The drive disk or plate 36 is formed with a central opening in which is set a central hub 58 extending axially outward or forward of plate 36. A driven shaft 59 is inserted axially in the hub 58 and the plate 36 and is held there by a set screw 60 inserted in a hole in the side of hub 58. The shafts 50 and 59 will be held in axial alignment by associated mounting means (not shown).

By the arrangement described the shaft 50 drives the arm 40 and the rings 26, 28 and 30 rotate with the driven plate 36. When the torque load imposed on the shaft 59 exceeds the magnetic grip between the rings 26, 28, and the plate 36, the drive rings will side frictionally in an annular path on the surface 34 with respect to the driven plate 36 which may remain stationary or may turn at a different speed from the rate of rotation of the driven plate 36 and the shaft 59. When the load torque drops in magnitude, the frictional force of the rings 26, 28 on the plate 36 will again be sufficient to permit the drive rings to drive the plate 36 at the same angular speed. It will thus be apparent that the torque limiting clutch acts like a mechanical circuit breaker to disconnect the driving and driven parts when a mechanical overload condition occurs, and to restore the driving connection automatically when the overload condition is removed or relieved.

A number of variations or modifications in the basic invention as hereinbefore described are possible. For example, the driven plate 36 need not be circular as shown, but may be rectangular, annular, spider-shaped or other shape. What is required is that the driven plate present at least an annular flat surface 34 against which the flat annular edges of the rings 26, 28, and 30 may abut and around which the rings can rotate.

Figure 10:
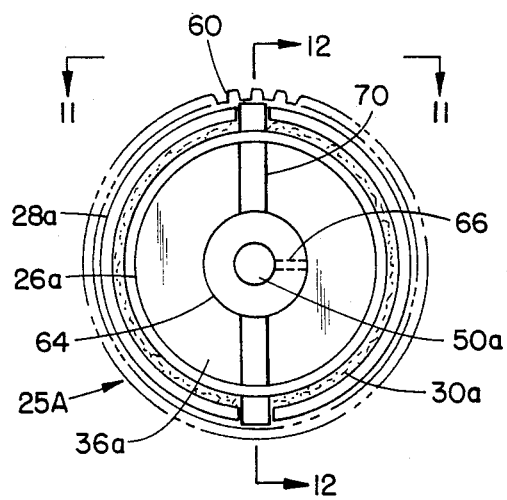
FIG. 10 is a rear side elevational view similar to FIG. 3, of another clutch illustrating a second form or embodiment of the invention.
Figure 11:
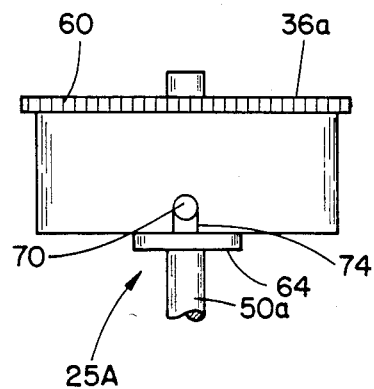
FIG. 11 is a top plan view taken along line 11—11 of FIG. 10.
Figure 12:
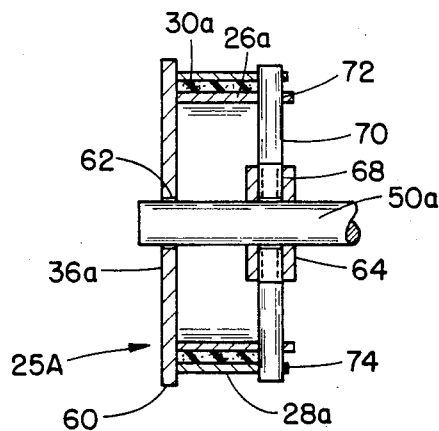
FIG. 12 is a cross sectional view taken along line 12—12 of FIG. 10.

FIGS. 10–12 illustrates a second clutch 25A illustrating possible modifications of the invention. Here a driven plate 36a has gear teeth 60 milled in its peripheral edge. A drive shaft 50a extends through a central hole 62 in the plate 36a, keeping the plate 36a and rings 26a, 28a, 30a in axial alignment. The drive shaft 50a drives rotationally a central hub 64 to which the shaft 50a is attached by a set screw 66. The hub 64 has a diametral hole or bore 68 in opposite ends of which are set rods 70 which extend radially outward through holes 72 in an inner ring 26a and through slots 74 in an outer ring 28a. Each of the rods 70 is held in place by threading each of them into a respective threaded hole in the hub 64.

In operation, the drive shaft 50a will turn the magnetizable rings 26a, 28a and the magnetic ring 30a with the driven plate 36a which in turn will drive associated gearing. In the event of an overload, rings 26a, and 28a will slid frictionally while turning against the plate 36a, in the same manner as described above for the clutch 25.

Figure 12A:
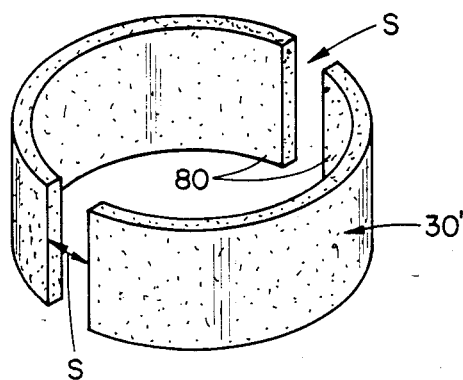
FIG. 12A is an oblique view of a modified form of ring magnet.

It is possible to adjust the magnetic grip between the driven plates 36, 36a and the drive rings 26, 28, or 26a, 28a by varying the amount of mateial in the magnet rings 30 or 30a. This can be done in various ways, such as by shortening the axial length of the magnet rings. Thus, as shown in FIGS. 6, 9, and 12 the axial length of the magnet rings 30, 30a is shorter than that of the concentric, laterally abutting magnetic drive rings 26, 28 and 26a, 28a. The circumferential length of the magnet ring 30 or 30a can also be varied. For example the magnet ring may have two arcuate sections 80 each extending less than 180 degrees with the spaces S between adjacent ends of the arcuate magnets of the permanent magnet 30' as illustrated in FIG. 12A. In practical miniature clutches the magnet rings can be rather thin, for example ranging from 1/16 to ⅛ of an inch in radial thickness, about these inches in diameter, and about one inch or less in axial length.

Figure 13:
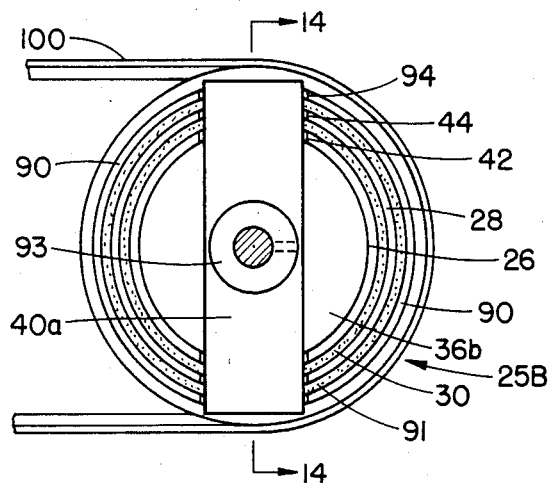
FIG. 13 is a rear elevational view similar to FIGS. 3 and 10, of a further clutch illustrating a third form or embodiment of the invention.
Figure 14:
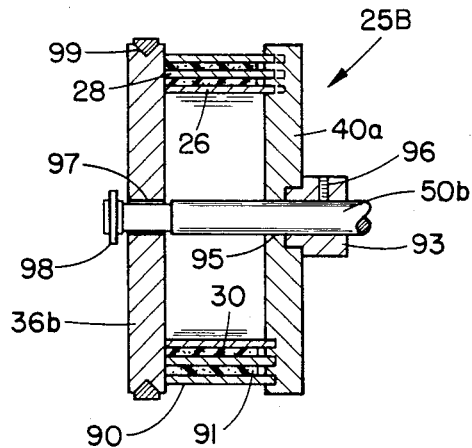
FIG. 14 is a cross-sectional view taken along line 14—14 of FIG. 13.
Figure 15:
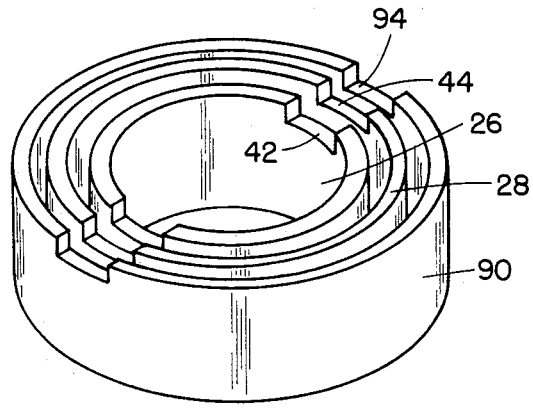
FIG. 15 is an enlarged perspective view similar to FIG. 8, showing an assemblage of three drive rings as empolyed in the clutch of FIGS. 13 and 14.
Figure 16:
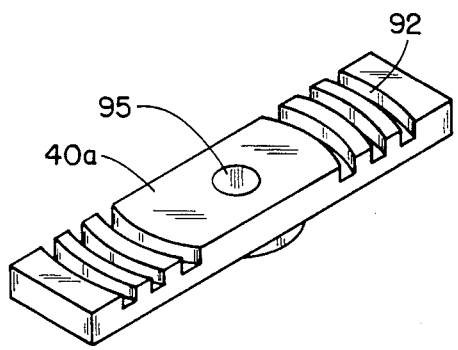
FIG. 16 is an enlarged isometric view of the drive arm or drive bar employed in the clutch of FIGS. 13, 14.
Figure 17:
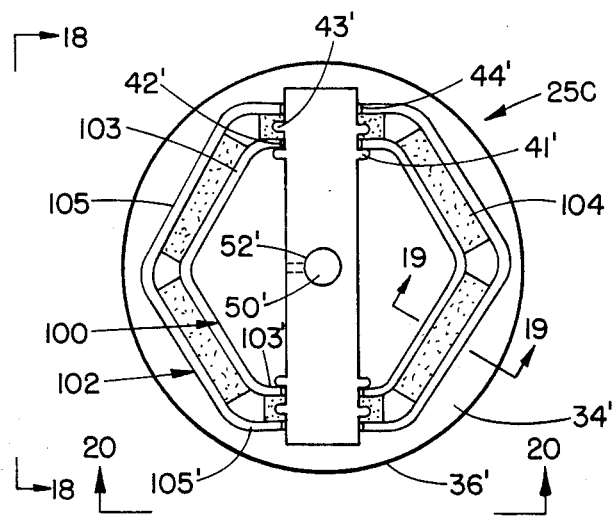
FIG. 17 is a rear elevational view of a fourth clutch embodying a fourth form of the invention.
Figure 18:
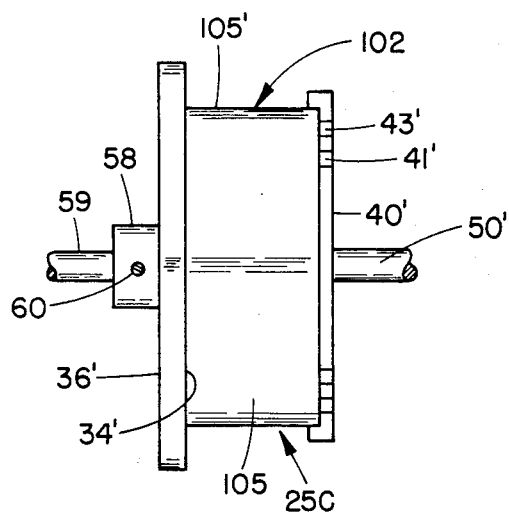
FIG. 18 is a side elevational view taken along line 18—18 of FIG. 17.
Figure 19:
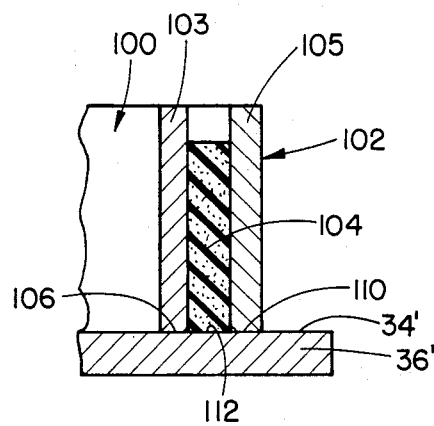
FIG. 19 is an enlarged fragmentary sectional view taken along line 19—19 of FIG. 17.
Figure 20:
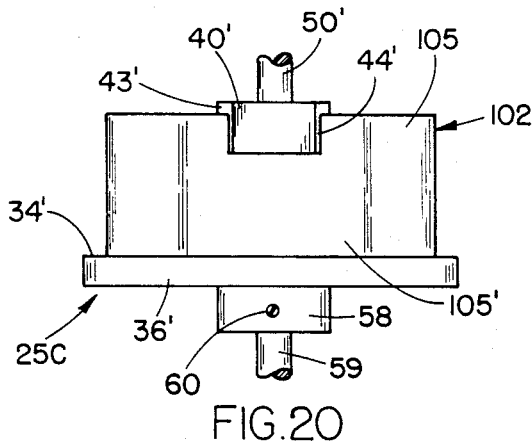
FIG. 20 is an enlarged top plan view taken along line 20—20 of FIG. 17.

In FIGS. 13 and 14 is illustrated a third form of a clutch 25B embodying further modifications of the invention. Here there are three, concentric magnetic drive rings 26, 28, and 90. As shown in FIG. 15, the rings 26, 28 and 90 have diametrally aligned notches 42, 44, 94. Drive arm 40a, as best shown in FIG. 16, has arcuate slots 92. The arm 40a is inserted into the notches 42, 44, 94, and the upper edges of the notches enter into the slots 92. This locks the arm 40a against radial and rotational movement with respect to the three drive rings 42, 44, 94. A hub 93 is centrally mounted on the arm 40a in alignement with a hole 95. A drive shaft 50b is secured by a set screw 96 in the hub 93. The drive shaft 50b extends loosely through a central hole 97 in a driven plate 36b. A C-ring or spring ring 98 is mounted on the free end of the shaft 50b at the outer side of the plate 36b. In the peripheral edge of the plate 36b is a V-groove 99 which may receive a driven V-belt 100 extending to a driven pulley and load. Two magnetic rings 30 and 91 are provided between and in abutment with adjacent sides of the three concentric rings 26, 28 and 90.

In the arrangement of clutch 25B, as described, the drive shaft 50b will drive the magnetizable and magnetic rings with the plate 36b until an overload condition occurs when the plate 36b will slip and turn with respect to the abutting edges of the magnetic rings 30, 91. Since three drive rings and two magnet rings are used in this clutch, greater drive torque can be applied and a greater torque of the driven load can be sustained before plate slippage occurs.

Figure 21:
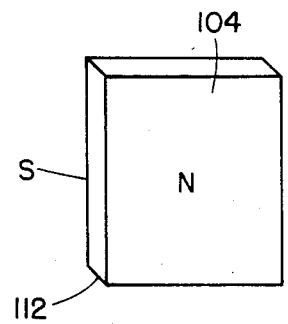
FIG. 21 is an oblique view of a permanent magnet employed in the clutch of FIGS. 17-20.

FIGS. 17-20 illustrate a fourth clutch 25C embodying further modifications of the invention. Here, two concentric magnetic drive rings 100 and 102 are generally hexagonal cylinders with six flat sides 103, 105. Between the two cylinders 100, 102 are flat, rectangular permanent magnets 104 magnetized with N and S poles at opposite sides; see FIG. 21. One magnet 104 is inserted between each pair of spaced opposing sides 103,105. The flat edges 106, 110, of the rings (FIG. 19) abut and adhere magnetically to a flat side 34' of a driven magnetic plate 36'. A drive arm 40', has tabs 41', 43' which engage inner sides of the rings 103, 104 at notches 42', 44' in outer or rear edges of sides 103', 105'. The drive arm 40' fits into the notches as explained in connection with clutch 25. A drive shaft 50' is held by a set screw in a hole 52' of the drive arm 40'. The driven shaft 59 is engaged in the hub 58 on a plate 36' by a set screw 60.

A clutch 25C operates in a similar manner as clutches 25, 25A and 25B hereinbefore described above. The hexagonal cylindrical or rings 100, 102 may be manufactured economically and simply by cutting standard hexagonal steel tubing into hexagonal sections of specified axial length. Such tubing is conventionally made of magnetizable steel which is perfectly suited for operation in the magnetic circuits of the clutch.

Figure 22:
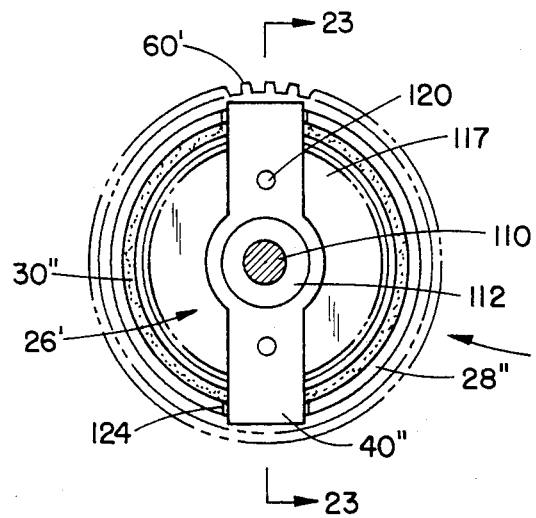
FIG. 22 is a rear elevational view of a fifth clutch embodying a fifth form of the invention.
Figure 23:
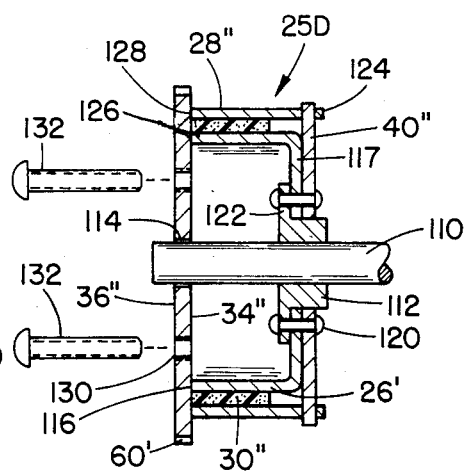
FIG. 23 is a cross sectonal view taken along line 23—23 of FIG. 22.

FIG. 22 and 23 show a further torque limiting clutch 25D embodying further modifications of the invention. In this clutch, a drive shaft 110 extends through a hub 112 in a drive arm 40" to which the shaft 110 is secured by a set screw not shown. The shaft 110 further extends loosely through a hole 114 in a flat driven plate 36". An inner magnetic ring 26' is cup shaped having a flat rim 116 abutting a flat facing side 34" of a plate 36". A rear side 117 of the ring 26' has a central hole through which the hub 112 extends. A plurality of rivets 120 secure an annular flange 122 of the hub 112 and the rear side 117 of the ring 26', and a drive arm 40" together. The outer ends of the drive arm 40" extend through diametrally aligned notches 124 in an outer magnetic ring 28". Between the round, cylindrical rings 26", 28" is a cylindrical permanent magnet 30". Flat front edges 126 of the inner ring 26" and 128 of outer ring 28" abut the flat side 34" of the driven plate 36". The outer rim of the driven disk or plate 36" is provided with gear teeth 60' used as described in connection with the gear teeth 60 of the clutch 25A in FIG. 12 for driving external associated gearing.

Two diametrally spaced threaded holes 130 are provided in the driven plate 36". These holes can receive threaded bolts or screws 132 which are axially longer than the cup shaped ring 26'. When the screws 132 are inserted in the holes 130 and tightened, the screws 132 force the drive rings 26", 28" and magnet ring 30" away from the flat side 34" of the driven plate 36". This use of the screws provides a convenient and expeditious way of separating the drive parts from the plate 36" without having to disassemble the clutch 25D as might be required with the clutches 25, 25A, 25B, 25C.

From the foregoing description it will be apparent that there have been provided variuos torque limiting clutches all having the feature of utilizing permanent magnets between concentric magnetizable rings for maintaining magnetic circuits with abutting driven plates. It has been further noted that the driven plates can carry driven shafts, gear teeth pulley belt, and the like to transmit driving torque to a load. In all forms of the invention when the torque of the driven mechanical load exceeds the magnetic grip of the drive parts on the driven plate, the drive plate slips frictionally around the drive rings while it remain magnetically engaged with the rings until the magnitude of the load torque drops sufficiently to re-establish the driving force on the driven plate. The drive bars 40, 40a, 40', 40" and drive rods 70 need not be magnetic members.

It should be understood that although not described, if desired, the driven plate may be arranged to hold the rings in concentric array, rather than the drive arm holding the rings. The primary consideration in holding the rings is that each ring may be axially free to make full edge contact with the plate if the arm is holding the rings or with the arm if the plate is holding the rings.

The clutches described are primarily intended for miniature applications having an overall diameter in the order of approximately three inches and an axial length of less than one inch. Larger or smaller clutches employing the principles of the invention can of course be readily constructed.

It should be understood that the foregoing relates to only a limited number of preferred embodiments of the invention which have been by way of example only and that it is intended to cover all changes and modifications of the example of the invention herein chosen for the purpose of the disclosure, which do not constitute departures from the spirit and scope of the invention.

What is claimed is:

1. A torque limiting clutch, comprising:
   a plurality of concentric magnetizable rings, each of said rings having coplanar flat edges at one side thereof;
   a magnetizable driven member having a flat surface portion and being adapted for driving a load, said coplanar flat edges of said rings abutting said flat surface of said driven member;
   permanent magnet means radially sandwiched between said rings for maintaining at least one magnetic circuit with said rings and said driven member, so that said rings adhere magnetically to said driven member; and
   mechanical drive means engaged with said rings for exerting a driving force thereon to rotationally drive said rings, so that said driven member rotates with said rings, and whereby said rings slip on said surface of said driven member when the torque of said load is greater than the driving torque of said mechanical drive means.

2. A torque limiting clutch as defined in claim 1, further comprising means for applying axial force between said driven member and said rings to separate said rings from said driven member.

3. A torque limiting clutch as defined in claim 1, wherein said mechanical drive means comprises a flat bar extending diametrally across said rings and adapted for rotation by a drive device.

4. A torque limiting clutch as defined in claim 3, wherein said rings have diametrally opposed notches for receiving said bar, so that said rings rotate with said bar.

5. A torque limiting clutch as defined in claim 4, wherein said bar has laterally extending ears engaging said rings to prevent longitudinal movement of said bar on said rings, and for maintaining predetermined radial spacing between said rings.

6. A torque limiting clutch as defined in claim 1, wherein said rings are cylindrical in form and at least two in number.

7. A torque limiting clutch as defined in claim 6, wherein said permanent magnet means has cyindrically curved portions.

8. A torque limiting clutch as defined in claim 1, wherein said rings are polygonal cylinders, and wherein said permanent magnet means have flat bar magnet portions.

9. A torque limiting clutch as defined in claim 1, wherein said rings are cylindrical in form and at least three in number, and wherein said permanent magnet means are at least two ring-like members respective disposed between each pair of said rings.

10. A torque limiting clutch as defined in claim 1, wherein said mechanical drive means comprises a flat bar extending diametrally across said rings and a drive shaft coupled to said bar for driving the same.

11. A torque limiting clutch as defined i claim 1, further comprising a driven shaft coupled to said magnetic driven member for coupling said load thereto.

12. A torque limiting clutch as defined in claim 1, further comprising gear teeth on said magnetic driven member for coupling driven gear means thereto.

13. A torque limiting clutch as defined in claim 1, wherein said magnetic driven member is provided with means for engaging a driven pulley belt.

14. A torque limiting clutch as defined in claim 1, wherein said permanent magnet means has north and south poles at opposite sides thereof abutting opposing sides of said rings to maintain said magnetic circuit therebetween.

15. A torque limiting clutch as defined in claim 14, wherein said permanent magnet means is a ring-like member which is axially shorter than said magnetic rings for determining the magnitude of driving torque applied to said driven member.

16. A torque limiting clutch as defined in claim 1, wherein said rings are polygonal cylinders having flat sides, said cylinders being at least two in number wherein sid permanent magnet means are flat bar magnets disposed respectively between adjacent sides of said cylinders; and wherein said mechanical drive means comprises a flat bar extending across pairs of opposed sides of said cylinders and engaged therewith to hold the same concentrically and radially spaced apart.

17. A torque limiting clutch as defined in claim 1, wherein said mechanical drive means comprises a flat bar extending diametrally across said rings, said bar having grooves in one side for receiving adjacent edges of said rings; said rings having diametrally opposed notches for receiving said bar, so that said rings are constrained against longitudinal and rotational movement with respect to said bar, and whereby said rings are positively driven by and rotate with said bar.

18. A torque limiting clutch as defined in claim 17, further comprising a drive shaft coupled to said bar to rotate the same.

19. A torque limiting clutch as defined in claim 1, wherein said driven member is a flat plate, and wherein said flat surface portion is annular for defining a path around which said rings slip when torque between said rings and said plate is overcome.

20. A torque limiting clutch as defined in claim 19, further comprising a driven shaft coupled to said flat plate for driving said load.

21. A torque limiting clutch as defined in claim 1, wherein said mechanical drive means comprises:
a hub;
a drive shaft extending axially through and engaged with said hub; and
axially aligned rods engaged with said hub and extending radially therefrom, said rods being engaged with outer edges of said rings for rotationally driving the same when said drive shaft rotates.

22. A torque limiting clutch as defined in claim 1, wherein said flat mechanical drive means comprises a flat bar extending diametrally across said rings and engaged therewith for rotating the same; and a drive shaft extending through and coupled to said bar for driving the same, said drive shaft extending axially through a hole in said driven member to keep said flat surface portion centered with respect to said rings.

* * * * *